(12) United States Patent
Bouat

(10) Patent No.: US 8,503,429 B2
(45) Date of Patent: Aug. 6, 2013

(54) PROCESSING REQUESTS AND GENERATING RESPONSES IN SESSION INITIATION PROTOCOL (SIP)

(75) Inventor: Sebastien Bouat, St Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 709 days.

(21) Appl. No.: 10/592,394

(22) PCT Filed: Mar. 15, 2005

(86) PCT No.: PCT/EP2005/051179
§ 371 (c)(1),
(2), (4) Date: Nov. 28, 2006

(87) PCT Pub. No.: WO2005/091589
PCT Pub. Date: Sep. 29, 2005

(65) Prior Publication Data
US 2007/0133440 A1    Jun. 14, 2007

(30) Foreign Application Priority Data
Mar. 18, 2004 (EP) .................................. 04300151

(51) Int. Cl.
*H04L 12/18* (2006.01)

(52) U.S. Cl.
USPC ........................................................ 370/352

(58) Field of Classification Search
USPC ........................................................ 370/352
See application file for complete search history.

(56) References Cited

U.S. PATENT DOCUMENTS

| | | | | |
|---|---|---|---|---|
| 5,966,380 A * | 10/1999 | Przygienda | ................... | 370/389 |
| 6,449,656 B1 * | 9/2002 | Elzur et al. | ................... | 709/236 |
| 7,042,871 B2 * | 5/2006 | Gallant et al. | ................ | 370/352 |
| 7,072,332 B2 * | 7/2006 | D'Souza | ........................ | 370/352 |
| 7,240,366 B2 * | 7/2007 | Buch et al. | ...................... | 726/14 |
| 7,243,370 B2 * | 7/2007 | Bobde et al. | .................... | 726/10 |
| 7,412,529 B2 * | 8/2008 | Ryu | .............................. | 709/230 |
| 7,788,408 B2 * | 8/2010 | Takeda et al. | ................. | 709/245 |
| 7,917,639 B2 * | 3/2011 | Selin et al. | .................... | 709/229 |
| 7,949,772 B2 * | 5/2011 | Pessi | ............................. | 709/230 |
| 2002/0181507 A1 * | 12/2002 | Jones | ........................... | 370/474 |
| 2003/0058838 A1 * | 3/2003 | Wengrovitz | .................. | 370/352 |
| 2003/0058839 A1 * | 3/2003 | D'Souza | ........................ | 370/352 |
| 2003/0135653 A1 * | 7/2003 | Marovich | ...................... | 709/250 |
| 2004/0107277 A1 * | 6/2004 | Levesque et al. | ............. | 709/223 |
| 2004/0152469 A1 * | 8/2004 | Yla-Outinen et al. | ......... | 455/453 |
| 2005/0034079 A1 * | 2/2005 | Gunasekar et al. | ............ | 715/753 |
| 2005/0047389 A1 * | 3/2005 | Bond et al. | .................... | 370/351 |
| 2005/0074026 A1 * | 4/2005 | Soncodi et al. | ................ | 370/465 |
| 2005/0083909 A1 * | 4/2005 | Kuusinen et al. | ............. | 370/352 |
| 2005/0114491 A1 * | 5/2005 | Bushmitch et al. | ........... | 709/223 |
| 2005/0185773 A1 * | 8/2005 | Burger et al. | ............... | 379/88.22 |
| 2007/0005803 A1 * | 1/2007 | Saifullah et al. | .............. | 709/245 |
| 2007/0268930 A1 * | 11/2007 | Bond et al. | .................... | 370/467 |
| 2009/0150567 A1 * | 6/2009 | Takeda et al. | ................. | 709/245 |

* cited by examiner

*Primary Examiner* — Jay P Patel

(57) ABSTRACT

According to one aspect of the present invention, there is provided a SIP network element, for processing messages received from other SIP elements in a network of SIP elements, wherein the element is adapted for receiving a predetermined type of SIP request, the request comprising a plurality of headers and data associated with each of the headers, the element further comprising: a message search function adapted for extracting data from a predetermined selection of said headers, processing logic for processing the extracted data; means for creating a predetermined type of response message associated with the received request, the response message comprising data extracted from the received message; and means for sending the created message to a destination identified in the created response message.

18 Claims, 3 Drawing Sheets

PROCESSING REQUESTS AND GENERATING RESPONSES IN SESSION INITIATION PROTOCOL (SIP)

The present invention relates generally to Session Initiation Protocol (SIP) networks and, more particularly, to improving the performance of at least certain SIP network elements.

BACKGROUND

Session Initiation Protocol (SIP), defined in Request for Comments (RFC) 3261, is an application-layer control and signaling protocol for establishing, modifying, and terminating real-time calls and conferences over primarily Internet protocol (IP) networks. A SIP network typically comprises numerous elements, including SIP user agent servers (UAS), SIP user agent clients (UAC), proxy servers, redirect servers and registrar servers.

SIP defines a layered communications protocol model as outlined in FIG. 1 which shows a typical SIP stack 100. The stack comprises a network layer 102, a transport layer 104, a transaction layer 106, an optional dialog layer 108 and a service or application layer 110.

The network layer 102 provides the appropriate Internet protocol (IP) connectivity to enable each SIP element to communicate over an IP network.

The transport layer 104 defines how a client sends requests and receives responses and how a server receives requests and sends responses over the network. A SIP server is a network element that receives requests in order to service them and sends back responses to those requests. The transport layer 104 is also responsible for framing SIP messages over the network.

The next layer is the transaction layer 106. A transaction is a request sent by a client transaction (using the transport layer) to a server transaction, along with all responses to that request sent from the server transaction back to the client. The transaction layer is responsible for enforcing compliant message sequences and for retransmitting and filtering duplicate SIP messages if the transport layer is not reliable. Any task that a user agent client (UAC) accomplishes takes place using a series of transactions.

The layer above the transaction layer is the transaction user (TU), or service layer 110. The service layer 110 is the application running on top of the SIP stack which provides the element specific functionality.

An optional dialog layer 108 may exist between the service layer 110 and the transaction layer 106. A SIP dialog identifies a set of related transactions. For example, in a standard phone call, setup and tear down are two related transactions within a single SIP dialog. The dialog layer is responsible for enforcing compliant transaction sequences and for managing the deficiencies between them.

SIP elements send requests and responses to other SIP elements in the form of SIP messages. SIP messages contain extensive information containing details, for example, of source address or URI, destination address, routing details, call identifiers, sequence numbers and so on as will be appreciated by those skilled in the art.

The SIP message format allows significant flexibility in the way in which the header information may be arranged and ordered within a message, and situations can arise where messages are logically equivalent whilst being syntactically different. For instance, SIP does not specify, for many headers, the order in which they should appear in a SIP message. Furthermore, SIP headers are generally case indifferent and SIP stacks from different vendors may construct messages in different ways. However, it is important that all SIP stacks are compatible with one another.

The decoding of SIP messages is performed by a grammar parser 112 which is an integral component of the SIP stack 100. The grammar parser 112 parses the message and extracts information relevant to a particular layer. Due to the number of different ways in which a SIP message conveying the same information may be constructed the grammar parser has to be able to extract the header information, parameter data and the like, irrespective of the message formatting. For example, the grammar parser has to be able to cope with upper and lower case characters, and variants of header separation such as line-feed characters, spaces, semi-colon, tab characters and so on. Grammar parsers thus provide complex parsing functionality. SIP stacks are typically provided as generic off-the-shelf components, and implement the whole of the SIP specification, making them suitable for use with any kind of SIP element.

Each of the different types of SIP element provide differing degrees of functional complexity, and the quantity of messages processed by each type of element varies widely. For example, SIP user agent clients and user agent servers are capable of performing complex processing and communication tasks, for example when setting up a call. At the same time, though, the number of messages processed by a UAC is typically relatively small. For example, a UAS may typically only process messages in relation to a call establishment request made by the UAC. Once a call is established, it is possible, assuming that no changes are made to the call parameters, for the UAC or the UAS not process any further messages until the call terminates.

Other elements, such as SIP redirect servers, on the other hand, perform somewhat simpler processing tasks, but receive a much higher quantity of messages to process. For example, a SIP redirect server performs the relatively simple task of registering a mapping between a SIP URI and an IP address at which the SIP URI can be reached. This is a fundamental task in a SIP network since redirect servers are used by SIP proxies for obtaining the current IP address of a user device prior to routing a call. This is particularly important in cases where mobile UACs access the network, as typically IP addresses are dynamically allocated and may change frequently. Furthermore, to ensure that the mapping information is up-to-date, each mobile UAC typically sends REGISTER messages at frequent intervals.

It is clear, therefore, that the number of such messages to be processed by a redirect server is typically substantially higher than those processed by a UAC. As an example, current registrar servers can typically process between 200 and 1000 registration operations per second.

However, with the emergence of new services using SIP, such as so-called push-to-talk (PTT) services, is expected a significant increase in the number of certain messages being sent, and this is likely to put strain on the existing network elements charged with processing these messages. It is foreseeable that some such elements may not be able to cope with this increase demand.

For example, push-to-talk services typically require each mobile device on the network to send a REGISTER message at least every five minutes. Not only will this lead to a significant increase in the number of such messages being sent across the network but as the popularity of such services grows so the number of mobile devices connected to the networks is expected to dramatically increase, thereby further compounding the situation.

As previously discussed, all SIP elements have been conventionally based on the same implementation model comprising a generic SIP stack plus an application or service layer providing the element specific functionality. This model has been used largely to ease the development times and cost of SIP network elements and to ensure interoperability with other network elements using SIP stacks from different vendors. However, due to increased performance pressures it is becoming apparent that, for certain SIP elements at least, such an approach is no longer desirable.

Accordingly, one aim of the present invention is to overcome or alleviate at least some of the aforementioned problems.

SUMMARY

According to a first embodiment of the present invention, there is provided a SIP network element, for processing messages received from other SIP elements in a network of SIP elements. The SIP element is adapted for receiving a predetermined type of SIP request, the request comprising a plurality of headers and data associated with each of the headers, and further comprises a message search function adapted for extracting data from a predetermined selection of said headers, processing logic for processing the extracted data, means for creating a predetermined type of response message associated with the received request, the response message comprising data extracted from the received message, and means for sending the created message to a destination identified in the created response message.

Advantageously, this can enhance the performance of at least certain SIP elements.

The SIP element may be adapted for receiving only a single predetermined type of SIP request message.

Suitably the SIP element is adapted for processing only a single SIP transaction.

The predetermined selection is preferably associated with the predetermined type of request.

Suitably the SIP element is stateless with no dialog context or transaction context being maintained on the SIP element.

Preferably the SIP element is adapted for processing retransmitted messages in the same way as initially received messages.

Suitably the SIP element may be a SIP registrar server, in which case the SIP element is adapted for receiving a SIP REGISTER message and the message analyzer is adapted for extracting data from the To, Contact and Expires headers of the message.

Suitably the SIP registrar server further comprises means for storing in a data store a mapping between the URI of the originator of the received message and an address indicated in the extracted data.

Suitably the means for creating the response message is adapted for creating a SIP 200 OK message Alternatively the SIP element may be a SIP redirect server, in which case the SIP element is adapted for receiving a SIP REDIRECT message and the message analyzer is adapted for extracting data from the To header of the message.

Suitably the SIP redirect server further comprises means for storing in a data store one or more addresses associated with the URI of the originator of the received message, the one or more addresses being indicated in the extracted data.

Suitably the means for creating the response message is adapted for creating a SIP 200 OK message.

Suitably the redirect server is further adapted to receive a SIP ACK response message.

According to a second aspect of the present invention, there is provided a SIP network comprising a SIP network element as described above.

It has been realized that the SIP specification defines certain concepts which, for certain SIP elements and functions, require additional processing steps to be performed that do not bring any specific value to those elements. In many cases these additional processing steps cause valuable system resources to be consumed. This may apply, for example to the concepts of dialogs and transactions within certain SIP elements such as SIP registrar and redirect servers. Furthermore, some SIP elements typically only use a sub-set of the functionality defined by SIP, and therefore use of a generic off-the-shelf SIP stack may not be the most efficient design choice.

BRIEF DESCRIPTION

The invention will now be described, by way of example only, with reference to the accompanying diagrams in which.

DETAILED DESCRIPTION

Figure 1:
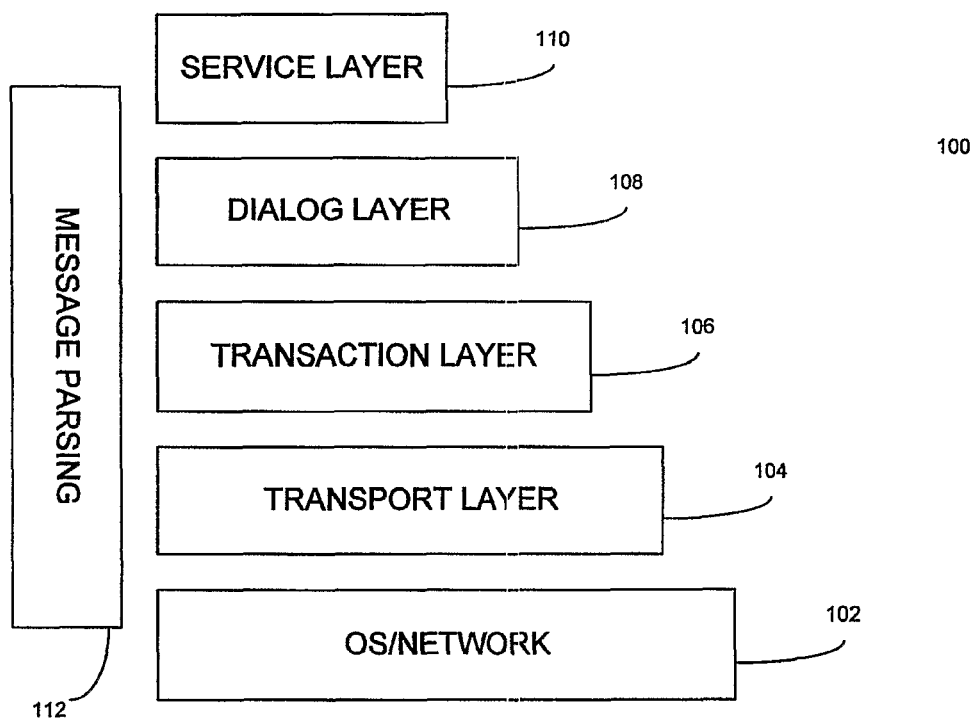
FIG. 1 is a block diagram of a conventional SIP stack 100 according to the prior art.
Figure 2A:
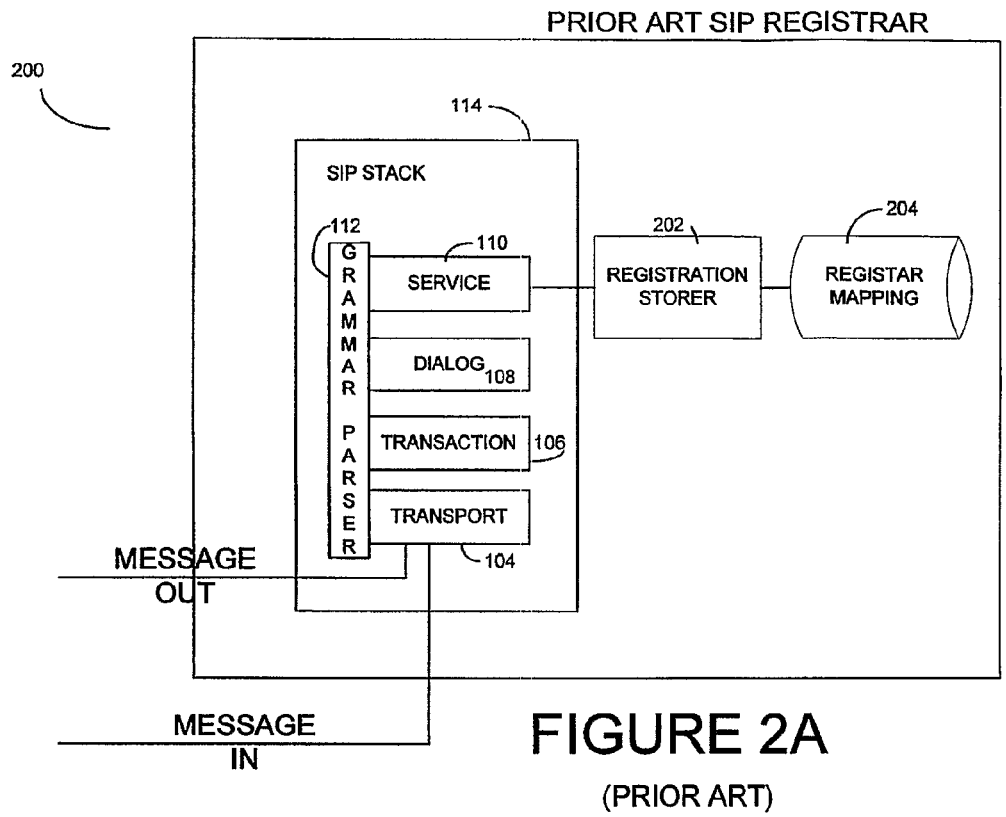
FIG. 2 is a block diagram showing a SIP registrar server according to the prior art.
Figure 2B:
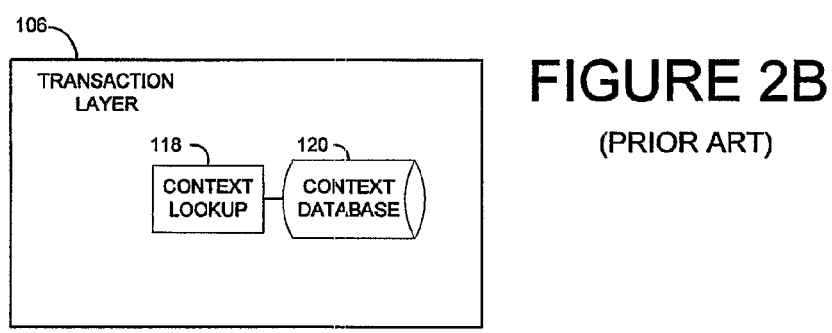

Referring now to FIG. 2 the structure and functionality of a SIP registrar server according to the prior art will now be described.

A REGISTER message, such as the example REGISTER message below, is sent from a SIP user agent client (UAC) to a SIP registrar server 200.

---

REGISTER sip:hp.com SIP/2.0
Via: SIP/2.0/UDP 15.204.113.175:5060;branch=z9hG4bKproxy1_2
Via: SIP/2.0/UDP ipuser1:5060;branch=z9hG4bKu1_2
From: user1 <sip:user1@hp.com>;tag=MyFromTag.1_2
To: user1 <sip:user1@hp.com>
Call-ID: 1@15.204.113.175
CSeq: 2 REGISTER
Contact: <sip:155.188.188.1>
Expires: 300
Content-Length: 0

---

Example SIP REGISTER Message

The message is received by the transport layer 104 in the SIP stack 114 of the registrar server 200 which delivers the message to the transaction layer 106. The transaction layer 106, using the grammar parser 112 of the SIP stack 114, extracts and processes the transaction identifier which is made up of a combination of the Call-ID, the From header, the To header, and the Cseq header. This enables the transaction layer 106 to determine whether the received message is a new transaction, or whether it is part of an existing transaction. In order to do this, the transaction layer 106 performs a database lookup, using a context lookup module 118 (FIG. 2B), and then stores some context information, such as the Via and Cseq headers, for each transaction in a context database 120. Storing information about each transaction enables the transaction layer to handle any eventual message retransmissions that may occur. The transaction layer 106 then forwards the message to the dialog layer 108.

Figure 2C:
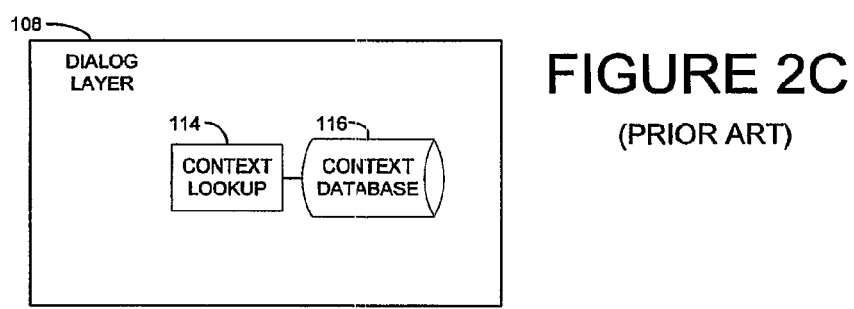

The dialog layer 108, using the grammar parser 112, extracts and processes the Call-ID header, the From header, and the To header to determine whether the received message forms part of an existing dialog or a new dialog. Again, this requires the dialog layer 108 to perform a database lookup using a context lookup module 114 and to store or retrieve the Call-ID header, the From header, and the To header from the dialog context database 116 (FIG. 2C).

Finally, the dialog layer 108 delivers the message to the registrar application layer 110 (service layer), which processes the To header, the Contact header and the Expires header to update the required registrar information in the Registrar server database 204.

The registrar application then responds to the UAC by sending a 200 OK message, an example of which is shown below.

```
SIP/2.0 200 OK
Via: SIP/2.0/UDP 15.204.113.175:5060;branch=z9hG4bKproxy1_2
Via: SIP/2.0/UDP ipuser1:5060;branch=z9hG4bKu1_2
From: "user1" <sip:user1@hp.com>;tag=MyFromTag.1_2
To: "user1" <sip:user1@hp.com>;tag=aa21
Call-ID: 1@15.204.113.175
CSeq: 2 REGISTER
Contact: <sip:155.188.188.1>expires=300
Content-Length: 0
```

Example SIP 200 OK Message

The response message is progressively built by each of the protocol layers, as described below.

The registrar application layer 110 sets the expire parameter of the Contact header, and passes the message to the dialog layer 108. The dialog layer 108 sets the To header and the dialog context headers.

The dialog layer 108 also sets a timer with an expire value to terminate the dialog after a given time period, as defined in the Expire parameter of the Contact header. The dialog layer 108 passes the message to the transaction layer 106 which sets the transaction context headers of the message, including the Call-ID and From headers, and saves this information, in case a message retransmission is required, in the dialog context database 116. Finally, the message is passed to the transport layer 104 which retrieves, from the Via header, the next hop IP address to send the response.

In addition to that, a background garbage collection routine (not shown) runs to cleanup transaction contexts kept for handling re-transmissions that become obsolete. A second garbage collection routine runs in the dialog layer to cleanup dialog contexts.

It can be observed that a SIP registrar server processes only a single transaction. For example, the transaction involved in registering with a registrar server comprises a single request and a single response message: a REGISTER message sent from a SIP user client to a registrar server; and a 200 OK message sent in response from the registrar server to the user agent client. Some other SIP elements, such as SIP redirect servers and SIP notifier servers also only process single SIP transactions. For example the transaction involved in a redirect operation comprises one request and two response messages: a REDIRECT message sent from a UAC to a redirect server; a 200 OK message sent in response from the redirect server to the UAC; and finally an ACK message is sent in acknowledgement from the UAC back to the redirect server.

Due to the relatively simple nature of the tasks performed by such SIP elements, it has been realized that the conventional approach of using a generic SIP stack and adapted application layer for implementing such elements is somewhat inefficient, and that potentially important performance gains may be obtained through use of a more monolithic and streamlined model, as will be described in more detail below. This is particularly true for those SIP elements which only need, by virtue of their inherent function, to process a single transaction, or which otherwise only use a sub-set of the functionality provided by SIP.

It has been further realized that, in general, SIP elements do not need to use or comply with the whole of the SIP specification, or even use a traditional SIP stack, providing that from an external point of view the SIP specification is complied with. Internally, there is no obligation for SIP elements to follow the architecture and processing models suggested by the SIP standard. Whilst such an approach may be considered to go somewhat against conventional thinking, since development costs are likely to be greater and development times longer, it is considered suitable for improving the performance of some SIP elements, such as SIP registrar servers and SIP redirect servers.

For example, since the operation performed by a registrar server only involves a single transaction, there is no need to establish or maintain a dialog context to cater for the potential retransmission of a REGISTER message. Furthermore, there is no need to establish or maintain a transaction context. For a start, the number of retransmitted messages is likely to be small and form only a small proportion of the overall number of SIP messages. In any case, if a UAC retransmits a REGISTER message this results in the same information as that contained in the previous REGISTER message being sent. If the registrar server receives a retransmitted message, there is no particular functional benefit to be gained in determining, through the transaction or dialog contexts, whether the message has been previously received and thus rejecting the message. Indeed, if no such retransmission mechanism is employed it is more efficient to treat the retransmitted message as an initial message and to use it to update the binding in the address resolution service, even if this is with the same information as that already contained therein.

In this case, a registrar server may be considered stateless since no dialog or transaction context information is stored or processed thereon. Furthermore, if no context information is stored there is additionally no requirement for garbage collection routines.

As previously mentioned, the main objective of a registrar server is to register, in an address resolution service, a binding between a user's SIP URI, and the address of a device on which the user is contactable. Hence, a registrar server is primarily interested in a sub-set of the information contained in a SIP REGISTER message, namely the To, Contact and Expires headers. Thus, since the registrar server is only interested in a limited subset of the headers in a SIP REGISTER message an optimized sub-string search function can be employed, rather than a generic SIP grammar parser found in typical SIP stacks. It will be appreciated that it is somewhat more efficient to use a specialized search function looking for only a small number of message headers, rather than a generic grammar parser capable of detecting all possible SIP message headers and parameters.

When the registrar server sends a response to the originator of the REGISTER message the registrar server can construct the 200 OK response messages by copying the relevant headers of the received REGISTER message. Response attributes such as the expires and tag parameters can be added where required. The destination address of the 200 OK message is simply the source address of the REGISTER message, and the registrar server does not need to parse the REGISTER message to extract the source address from the message.

An example high-performance SIP registrar server according to an embodiment of the present invention is now described with reference to FIGS. 3 and 4. In this embodiment the SIP stack used by the SIP registrar server is not divided into layers, as in the prior art, but is substantially monolithic in nature.

Figure 3:
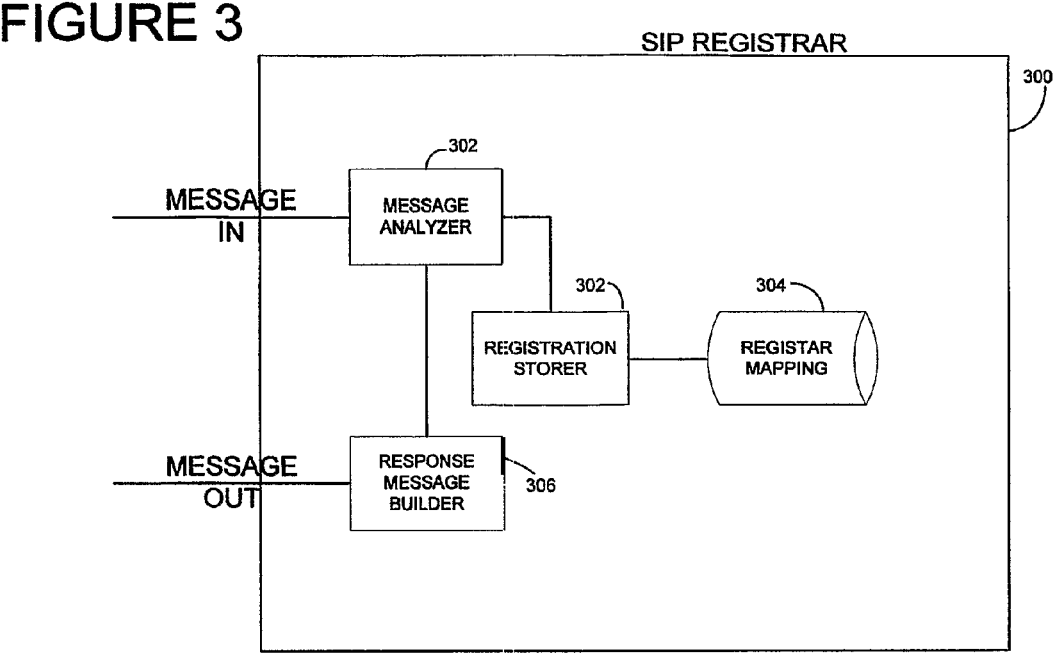
FIG. 3 is a block diagram showing a SIP registrar server according to an embodiment of the present invention.
Figure 4:
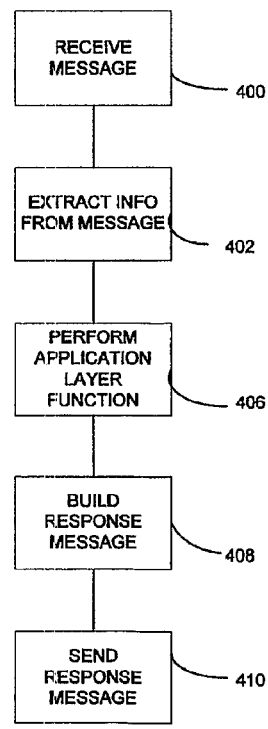
FIG. 4 is a flow diagram outlining example processing steps of the SIP registrar server according to an embodiment of present invention.

Referring now to FIGS. 3 and 4, there is shown a high-performance SIP registrar server 300 according to an embodiment of the present invention. A SIP REGISTER message is received by a message analyzer 302 (step 400). The message analyzer 302 uses, for example, a suitable compact and efficient search function limited to detect and extract (step 402) the essential information required by the SIP registrar server 300, namely information from the To, Contact and Expires headers. Those skilled in the art will understand that any suitable search function may be used.

The extracted information is passed to a registration storage unit 302 which stores (step 406) the appropriate registration information in a registrar mapping database 304.

Once the information has been stored, a 200 OK message is constructed (step 408) by a response message builder 306. The message builder 306 copies most of the headers from the received REGISTER message, and adds response attributes in the form of the expires and tag parameters. The destination address of the response message is obtained from the source address of the received REGISTER message, which, advantageously means that the message analyzer does not have to analyze the REGISTER message to extract the source address from the message. Once the 200 OK message is complete, it is sent to the next hop address indicated in the Via header of the message (step 410), as will be appreciated by those skilled in the art.

It can be seen, therefore, that unlike prior art solutions which use a model which separates message processing and parsing from the application functionality, a network element according to the present embodiment uses a more integrated and direct model. Such an approach not only helps help free system resources and lessen the performance requirements of a SIP network element such as a registrar server but importantly allows an existing registrar server to be able to process a higher number of simultaneous operations than was previously possible. This is of particular interest in the telecommunications industry where the number of simultaneous processing operations is a significant distinguishing feature of competitor products.

In tests, such a high-performance registrar server has shown performance increases of over 20 times, compared to prior art registrar servers such as that described above with reference to FIG. 2. Such performance readily meets the aforementioned expected future requirements for registration processing.

It should be noted that the above-description is made primarily with reference to SIP registrar servers, however those skilled in the art will appreciate that the techniques described herein may be applied, with appropriate modification if required, to other SIP elements, for example SIP redirect servers and SIP notifier servers.

The invention claimed is:

1. A SIP network element, for processing messages received from other SIP elements in a network of SIP elements,
wherein the element is configured to receive an unparsed SIP request message associated with a predetermined type of SIP request message, the unparsed SIP request message comprising a plurality of headers and data associated with each of the headers and wherein no transaction context is maintained thereon,
the element further comprising:
a message analyzer to perform a search on the unparsed SIP request message targeting only a selected subset of the headers to generate an extracted data set from the unparsed SIP request message;
a processing logic component for processing the extracted data set to produce a response data set;
a message creation component configured to create a response message of a predetermined type associated with the received request message, the response message comprising the response data set from the received request message; and
a message sending component configured to send the response message to a destination identified in the response message.

2. The SIP element according to claim 1, configured to receive only a single predetermined type of SIP request message.

3. The SIP element according to claim 1, configured to process only a single type of SIP transaction.

4. The SIP element according to claim 1, wherein said predetermined selection is associated with the predetermined type of request message.

5. The SIP element according to claim 1, wherein the SIP element is stateless.

6. The SIP element according to claim 1, configured to process retransmitted messages.

7. The SIP element according to claim 1, wherein the SIP element is a SIP registrar server.

8. The SIP element according to claim 7, wherein the element is configured to receive a SIP REGISTER message and the message search component is configured to extract data from a To header, a Contact header and an Expires header of the message.

9. The SIP registrar server according to claim 7, wherein the processing logic component is configured to store in a data store a mapping between a URI of an originator of the received request message and an address indicated in the extracted data set.

10. The SIP registrar server according to claim 7, wherein the message creation component is configured to create a SIP 200 OK message.

11. The SIP element according to claim 1, wherein the SIP element is a SIP redirect server.

12. The SIP redirect server according to claim 11, wherein the element is configured to receive a SIP REDIRECT message and the message search component is configured to extract data from a To header of the message.

13. The SIP redirect server according to claim 11, wherein the processing logic component is configured to store in a data store one or more addresses associated with a URI of an originator of the received request message, the one or more addresses being indicated in the extracted data set.

14. The SIP redirect server according to claim 11, wherein the message creation component is configured to create a SIP 200 OK message.

15. The SIP redirect server according to claim 11 further configured to receive a SIP ACK response message.

16. A SIP network element, for processing messages received from other SIP elements in a network of SIP elements,
wherein the element is configured to receive an unparsed SIP request message associated with a predetermined type of SIP request message, the unparsed SIP request message comprising a plurality of headers and data associated with each of the headers, and wherein no dialog context is maintained thereon, the element further comprising:

a message search component configured to perform a search on the unparsed SIP request message to extract an extracted data set from a predetermined selection of said headers from the unparsed SIP request message;

a processing logic component for processing the extracted data set to produce a response data set;

a message creation component configured to create a response message of a predetermined type associated with the received request message, the response message comprising the response data set from the received request message; and a message sending component configured to send the response message to a destination identified in the response message.

17. A SIP network element, for processing messages received from other SIP elements in a network of SIP elements, wherein the element is configured to receive an unparsed SIP request message associated with a predetermined type of SIP request message, the unparsed SIP request message comprising a plurality of headers and data associated with each of the headers, and wherein no transaction context is maintained thereon, the element further comprising:

a message analyzer search component configured to perform a search on the unparsed SIP request message to extract an extracted data set from the unparsed SIP request message based on a predetermined selection of said headers;

a processing logic component for processing the extracted data set to produce a response data set;

a message creation component configured to create a response message of a predetermined type associated with the received request message, the response message comprising the response data set from the received request message; and a message sending component configured to send the response message to a destination identified in the response message.

18. A SIP network comprising at least one SIP network element, for processing messages received from other SIP elements in the SIP network, wherein the element is configured to receive an unparsed SIP request message associated with a predetermined type of SIP request message, the unparsed SIP request message comprising a plurality of headers and data associated with each of the headers and wherein no dialog context is maintained thereon, the element further comprising:

a message analyzer to perform a search on the unparsed SIP request message targeting only a selected subset of the headers to generate an extracted data set from the unparsed SIP request message;

a processing logic component for processing the extracted data set to produce a response data set;

a message creation component configured to create a response message of a predetermined type associated with the received request message, the response message comprising the response data set from the received request message; and a message sending component configured to send the response message to a destination identified in the response message.

* * * * *